United States Patent
Gopinath et al.

(10) Patent No.: US 10,560,525 B2
(45) Date of Patent: Feb. 11, 2020

(54) SYNCHRONIZATION BETWEEN VIRTUAL NETWORK FUNCTIONS AND HOST SYSTEMS

(71) Applicant: Juniper Networks, Inc., Sunnyvale, CA (US)

(72) Inventors: Sudheendra Gopinath, Bangalore (IN); Mallikarjun Tallapragada, Bangalore (IN); Hariharasubramanian Cinthamani Sankaran, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 310 days.

(21) Appl. No.: 15/629,434

(22) Filed: Jun. 21, 2017

(65) Prior Publication Data

US 2018/0375932 A1 Dec. 27, 2018

(51) Int. Cl.
  *H04L 29/08* (2006.01)
  *G06F 9/455* (2018.01)
  *H04L 12/24* (2006.01)
  *H04L 12/26* (2006.01)

(52) U.S. Cl.
  CPC ...... *H04L 67/1095* (2013.01); *G06F 9/45558* (2013.01); *H04L 41/0677* (2013.01); *H04L 43/10* (2013.01); *H04L 43/12* (2013.01); *G06F 2009/45595* (2013.01)

(58) Field of Classification Search
  CPC . H04L 67/1095; H04L 43/12; H04L 41/0677; H04L 43/10
  See application file for complete search history.

(56) References Cited

U.S. PATENT DOCUMENTS

2016/0337329 A1* 11/2016 Sood ............... H04L 63/08

FOREIGN PATENT DOCUMENTS

WO 2014176105 A1 10/2014

OTHER PUBLICATIONS

Extended European Search Report for Application No. EP18175123.1, dated Nov. 22, 2018, 8 pages.
Yukihiro N., et al., "Dynamic Virtual Network Configuration Between Containers using Physical Switch Functions for NFV Infrastructure," 2015 IEEE Conference on Network Function Virtualization and Software Defined Network (NFV-SDN), IEEE, Nov. 18, 2015, pp. 156-162, XP032852437, DOI: 10.1109/NFV-SDN.2015.7387421.

* cited by examiner

*Primary Examiner* — El Hadji M Sall
(74) *Attorney, Agent, or Firm* — Harrity & Harrity, LLP

(57) ABSTRACT

A network function virtualization (NFV) platform may include one or more processors to identify a condition associated with the NFV platform, where the condition may affect operation of at least one virtual network function (VNF) hosted by or associated with the NFV platform; determine, based on the condition, information that may be provided or an action that may be performed with regard to the at least one VNF; and/or generate or transmit a message identifying the information and/or that may cause the action to be performed with regard to the at least one VNF.

20 Claims, 5 Drawing Sheets

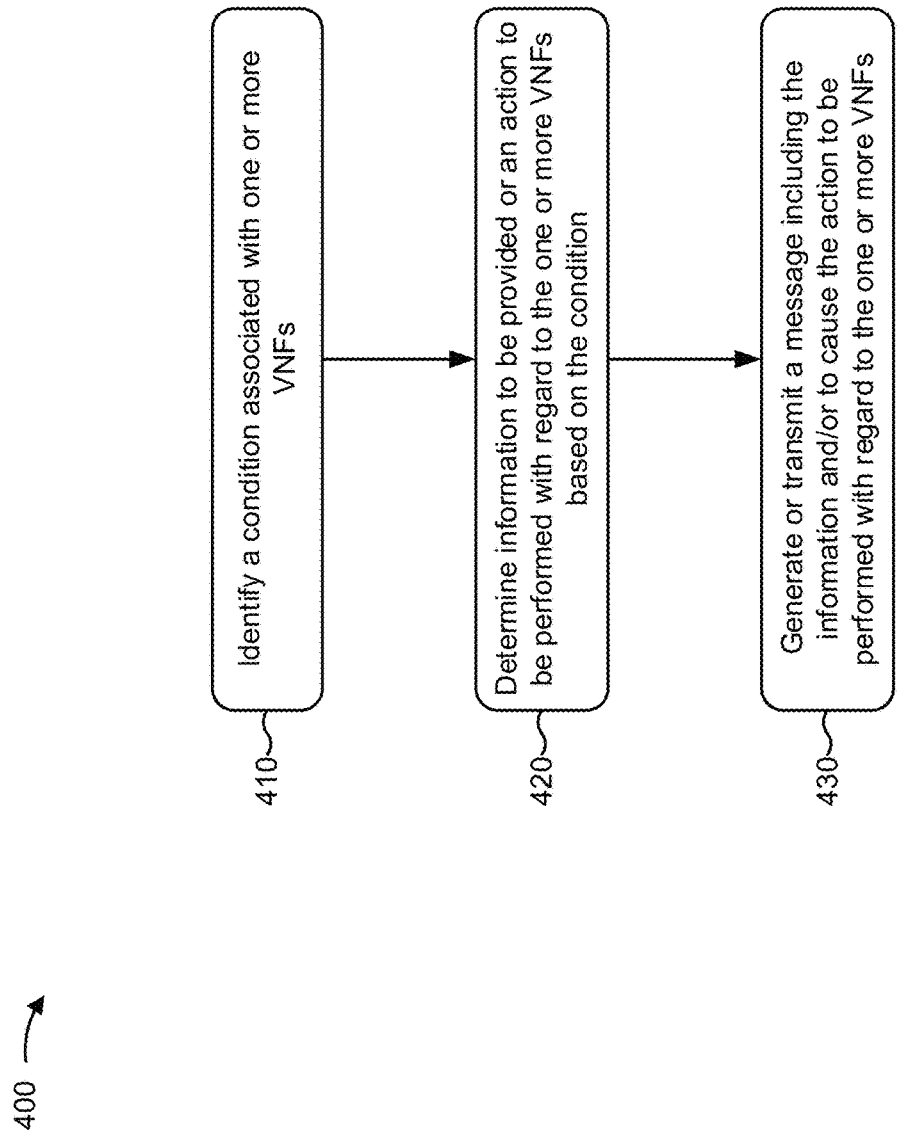

SYNCHRONIZATION BETWEEN VIRTUAL NETWORK FUNCTIONS AND HOST SYSTEMS

BACKGROUND

Network function virtualization (NFV) is a network architecture concept that uses the technologies of information technology virtualization to virtualize classes of network node functions into building blocks that may connect, or chain together, to create communication services. An NFV deployment includes one or more virtualized network functions (VNFs), which include virtual machines (VMs) or Linux containers running software on processors. The VNFs may be implemented on high-volume servers, switches, and storage devices, or within a cloud computing environment, rather than using custom hardware appliances for each network function.

SUMMARY

According to some possible implementations, a network function virtualization (NFV) platform may include one or more processors to identify a condition associated with the NFV platform, where the condition may affect operation of at least one virtual network function (VNF) hosted by or associated with the NFV platform; determine, based on the condition, information that may be provided or an action that may be performed with regard to the at least one VNF; and/or generate or transmit a message identifying the information and/or that may cause the action to be performed with regard to the at least one VNF.

According to some possible implementations, a method may include identifying, by an NFV platform, first information associated with the NFV platform, where the first information may relate to operation of at least one VNF hosted by or associated with the NFV platform; determining, by the NFV platform and based on the first information, second information that may be provided or an action that may be performed with regard to the at least one VNF; and/or generating or providing, by the NFV platform, a message identifying the second information and/or to cause the action to be performed with regard to the at least one VNF.

According to some possible implementations, a non-transitory computer-readable medium may store one or more instructions that, when executed by one or more processors, may cause the one or more processors to identify a condition associated with a physical interface associated with an NFV platform, where the condition may affect operation of at least one VNF hosted by or associated with the NFV platform; determine, based on the condition, information that may be provided and an action that may be performed with regard to the at least one VNF; and/or generate or transmit a message identifying the information and causing the action to be performed with regard to the at least one VNF.

BRIEF DESCRIPTION OF THE DRAWINGS

FIG. 4 is a flow chart of an example process for synchronization between a host system and VNFs.

DETAILED DESCRIPTION

Figure 1A:
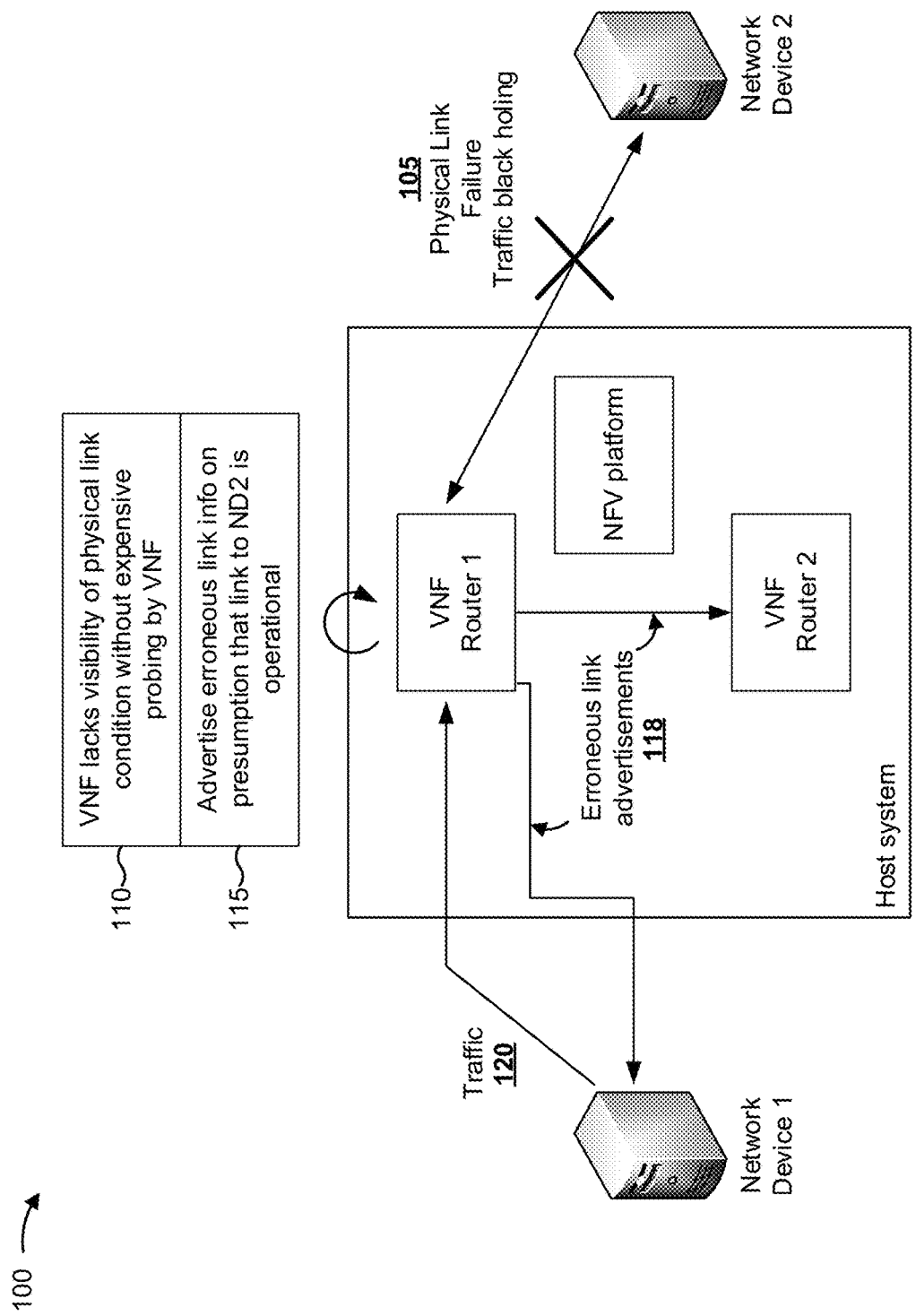
FIGS. 1A and 1B are diagrams of overviews of example implementations described herein.

The following detailed description of example implementations refers to the accompanying drawings. The same reference numbers in different drawings may identify the same or similar elements.

NFV is a technology to run network functions, such as stateful firewalls, wide area network (WAN) accelerators, wireless local area network (LAN) controllers, and/or the like on a host system. For example, the network functions may be run as VNFs on hardware platforms. The VNFs can be virtual machines (VMs), Linux containers, and/or the like. The benefits of NFV may include elastic capacity, multi-vendor choice, easier deployment of services, remote management of the host system, and/or the like. An example use-case of NFV may include deployment on customer premises equipment (CPE), which may be managed remotely by a service provider.

On the host system, an NFV platform may manage communication of VNFs with physical interfaces of the host system, may manage lifecycles of VNFs, and may provide backbone networking support for service-chaining of VNFs. For example, VNFs may include similar software to software that runs on corresponding hardware appliances. Physical interfaces of a hardware appliance may be represented by virtual interfaces in the VNF. Multiple VNFs may be service-chained to provide a set of network services similar to those provided by hardware appliances, and traffic to and from the multiple VNFs may be received and transmitted via physical interfaces of the host system.

In some cases, a VNF may not be able to easily identify physical aspects of the host system, such as states of physical interfaces, parameters associated with the host system, internet protocol (IP) information, and/or the like. For example, the VNF may not be capable of monitoring such physical aspects, or it may be resource-intensive to probe physical interfaces. This may lead to problems, such as traffic black holing or packet loss, inferior transport control protocol/user datagram protocol (TCP/UDP) performance, and/or the like. These problems may further lead to additional problems for devices receiving services via the NFV platform as those devices may not receive traffic or packets as expected, resulting in failures, inoperability, and/or the like. Problems associated with VNFs being unable to identify aspects of the host system are described in more detail in connection with FIG. 4, below.

Some implementations described herein may provide a communication channel and protocol for communication between the NFV platform and VNFs to exchange information regarding the host system and/or other VNFs. For example, some implementations described herein may provide a standardized messaging system to convey information regarding physical aspects of the host system to VNFs hosted on the host system or VNFs in communication with the host system. In this way, states of physical interfaces, parameters associated with the host system, internet protocol (IP) information, and/or the like can be communicated from the NFV platform to the VNFs, which improves performance of the VNFs and reduces the occurrence of problems relating to lack of visibility of physical aspects of the host system. Thus, VNF performance may be improved without requiring implementation of an external controller or resource-intensive monitoring operations by the VNFs. Further, network performance (e.g., of a network that includes the host system) may be improved relative to a network that does not include an NFV platform that conveys information regarding physical aspects of the host system to VNFs hosted on the host system or VNFs in communication with the host system.

Figure 1B:
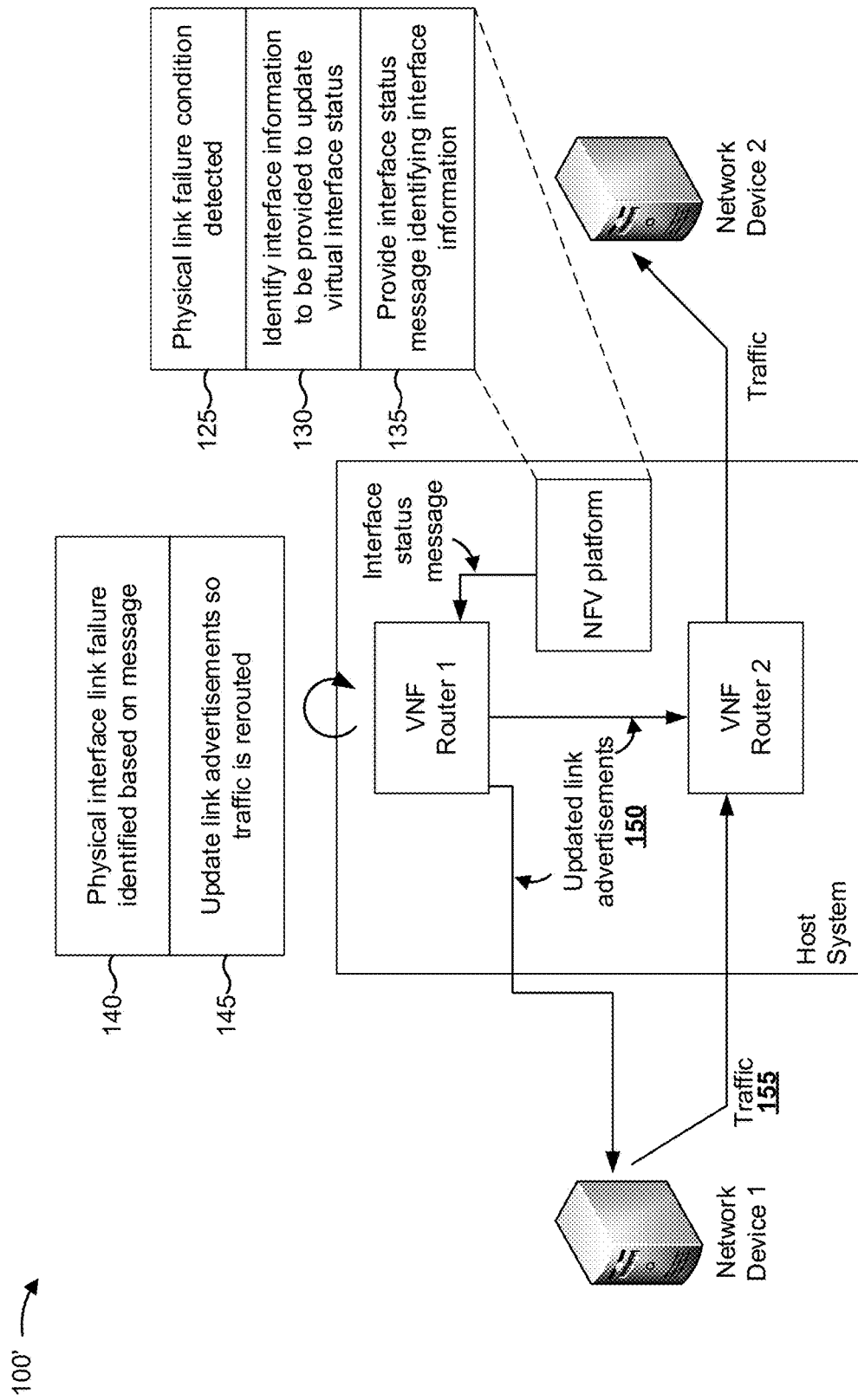

FIGS. 1A and 1B are diagrams of overviews of example implementations 100 and 100' described herein. As shown in FIGS. 1A and 1B, example implementations 100 and 100' may include network device 1 and network device 2 and a host system including VNF router 1 and VNF router 2.

As shown by reference number 105 in FIG. 1A, assume that a physical link between network device 2 and VNF router 1 fails, which may lead to traffic black holing (e.g., due to the VNF router 1 sending traffic to network device 2 through a failed physical link). As shown by reference number 110, the VNF router 1 may lack visibility of a condition of physical links (e.g., a physical link between network device 2 and VNF router 1) without expensive probing by VNF router 1 (i.e., without VNF router 1 frequently verifying an existing physical link with network device 2). For this reason, the traffic en route to network device 2 may be lost because VNF router 1 does not have information indicating that the physical link with network device 2 has failed. As a result, and as shown by reference number 115, VNF router 1 may advertise erroneous link information based on a presumption that the link to network device 2 is operational. As shown by reference number 118, VNF router 1 may provide erroneous link information to VNF router 2 and to network device 1. Accordingly, based on the erroneous link information, as shown by reference number 120, network device 1 may continue to route traffic to VNF router 1 as a result, which may lead to traffic black holing or packet loss when VNF router 1 attempts to route the traffic through the failed physical link to network device 2.

As shown in FIG. 1B, example implementation 100' includes an NFV platform capable of providing an interface status message to VNF router 1 to address the erroneous link advertisements provided in FIG. 1A. As shown by reference number 125, the NFV platform may detect a condition identifying the physical link failure. For example, the NFV platform may communicate with the host system to identify failed physical links or other information. As shown by reference number 130, the NFV platform may identify interface information to be provided (e.g., may identify which physical interface is down, which physical interface is up, which physical interface has delays that satisfy a threshold, etc.) so that VNF router 1 can update a virtual interface status (e.g., to indicate that the virtual interface mapped to the failed physical interface is not to be used).

As shown by reference number 135, the NFV platform may generate an interface status message (described in more detail with regard to FIG. 4) identifying the interface information, and may provide the interface status message to VNF router 1. For example, the NFV platform may provide the interface status message via a virtual serial interface, an IP interface, and/or the like. As shown by reference number 140, the VNF router 1 may identify a physical interface link failure based on the interface status message. As shown by reference number 145, the VNF router 1 may update link advertisements so traffic is rerouted. As shown by reference number 150, VNF router 1 may provide updated link advertisements (based on identifying failure of the physical interface) to network device 1 and VNF router 2. As shown by reference number 155, network device 1 may use the updated link advertisement to determine that traffic is to be routed via VNF router 2.

Some implementations described herein may provide a communication channel and protocol for communication between an NFV platform and VNFs to exchange information regarding the host system (that hosts the NFV platform and/or the VNFs) and/or other VNFs. For example, some implementations described herein may provide a standardized messaging system to convey information regarding physical aspects of the host system to VNFs hosted on the host system or VNFs in communication with the host system. In this way, states of physical interfaces, parameters associated with the host system, IP information, and/or the like can be communicated from the NFV platform to VNFs hosted by or in communication with the host system, which improves performance of the VNFs and reduces the occurrence of problems relating to lack of visibility of physical aspects of the host system. Thus, VNF performance may be improved without requiring implementation of an external controller or resource-intensive monitoring operations by the VNFs.

As indicated above, FIGS. 1A and 1B are provided merely as examples. Other examples are possible and may differ from what was described with regard to FIGS. 1A and 1B.

Figure 2:
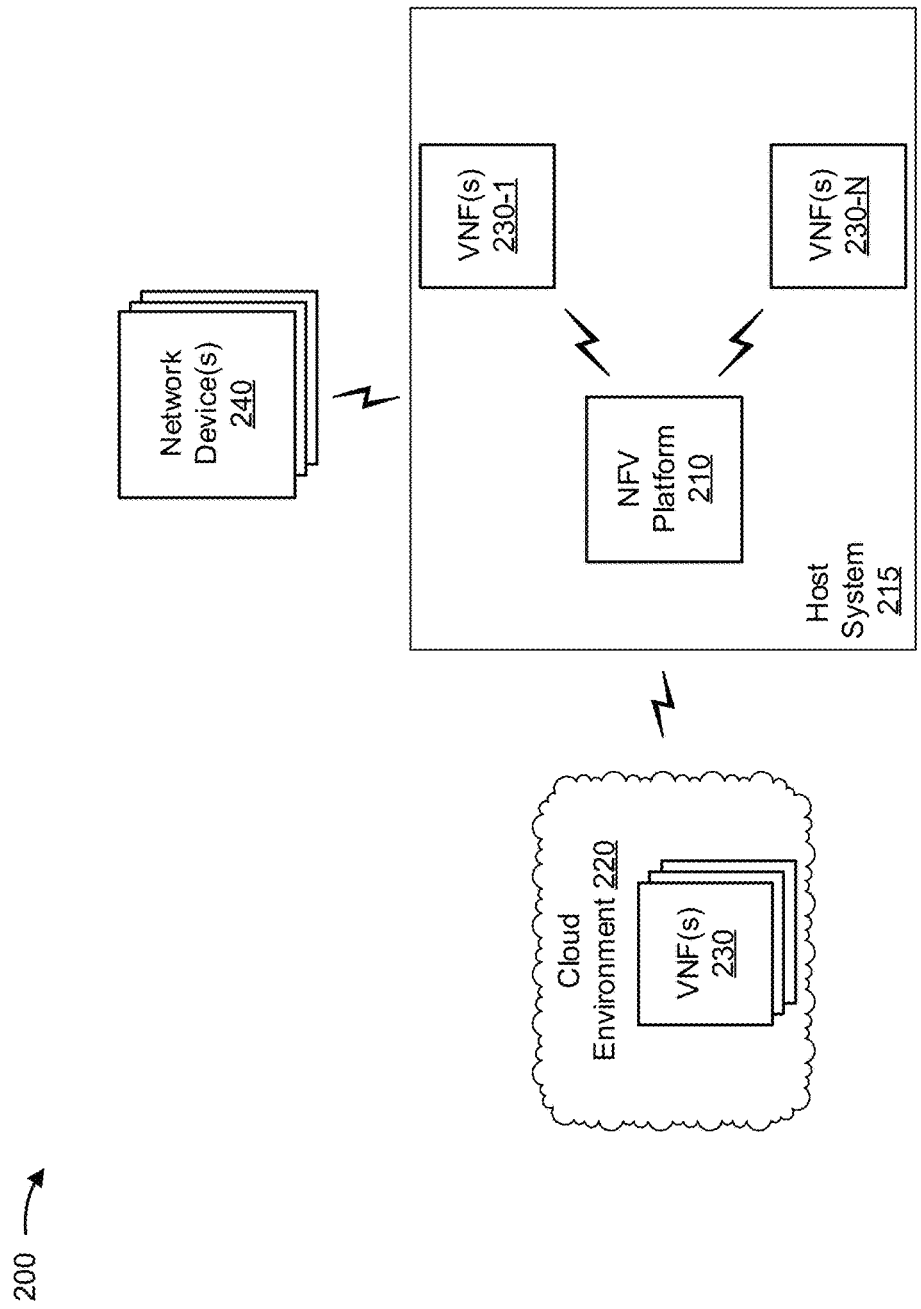
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an NFV platform 210 in a host system 215, a cloud environment 220, one or more VNFs 230, 230-1 through 230-N(N≥1) in the cloud environment and/or host system 215 (hereinafter referred to collectively as "VNFs 230," and individually as "VNF 230"), and one or more network devices 240. Devices of environment 200 may interconnect via wired connections, wireless connections, or a combination of wired and wireless connections.

NFV platform 210 may include a platform or environment that includes one or more VNFs 230. NFV platform 210 may manage a lifecycle of VNF 230, and may provide backbone networking support for service-chaining of VNFs 230. NFV platform 210, in conjunction with VNF(s) 230, may provide elastic capacity, multi-vendor choice for VNFs 230, easier deployment of services, remote management of VNFs 230, and/or the like. In some implementations, VNF 230 may include or be implemented on customer premises equipment (CPE) which may be managed remotely by a service provider. In some implementations, NFV platform 210 may communicate with host system 215 to receive, transmit, or route traffic between virtual interfaces associated with VNFs 230 and physical interfaces of host system 215, as described in more detail below. For example, NFV platform 210 may be aware of a state of a physical interface of host system 215. In some implementations, NFV platform 210 may include an operating system or kernel of host system 215. Additionally, or alternatively, NFV platform 210 may communicate with an operating system or kernel of host system 215 to determine a state of a physical interface of host system 215.

NFV platform 210 may be implemented on, associated with, or hosted by host system 215. Host system 215 includes one or more devices capable of implementing NFV platform 210 and/or VNF(s) 230. For example, host system 215 may include a server device or a group of server devices. Host system 215 may be associated with one or more physical interfaces (e.g., physical network interfaces, ports, backbone connections, hardware connections, etc.). In some implementations, host system 215 may include a server-class hardware platform.

VNF(s) 230 may include a VNF that performs a network function. For example, VNF 230 may include a stateful firewall, a WAN accelerator, a wireless LAN controller, a virtual router, a virtual switch, and/or the like. In some implementations, multiple VNFs 230 (e.g., tens of VNFs 230, hundreds of VNFs 230, and/or the like) may be implemented on host system 215. Additionally, or alternatively, one or more VNFs 230 may be implemented in a cloud environment 220 that may be remote from host system 215. Additionally, or alternatively, in some implementations, the cloud environment 220 may be implemented on host system 215.

VNF 230 may receive and transmit information via a virtual interface. Mapping of virtual interfaces of VNFs 230 to physical interfaces of host system 215 may be handled by NFV platform 210. In some implementations, VNF 230 may not be able to easily determine a status of a physical interface of host system 215. For example, VNF 230 may be capable of probing a physical interface, but this may be resource-intensive.

Network device 240 includes one or more devices (e.g., one or more traffic transfer devices) capable of processing and/or transferring traffic. For example, network device 240 may include a firewall, a router, a gateway, a switch, a hub, a bridge, a reverse proxy, a server (e.g., a proxy server), a security device, an intrusion detection device, a load balancer, or a similar device. Network device 240 may receive, transmit, and/or route information based on route advertisements received from VNF(s) 230 and/or host system 215.

In some implementations, network device 240 may be a physical device implemented within a housing, such as a chassis. In some implementations, network device 240 may be a virtual device implemented by one or more computer devices of a cloud computing environment or a data center.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
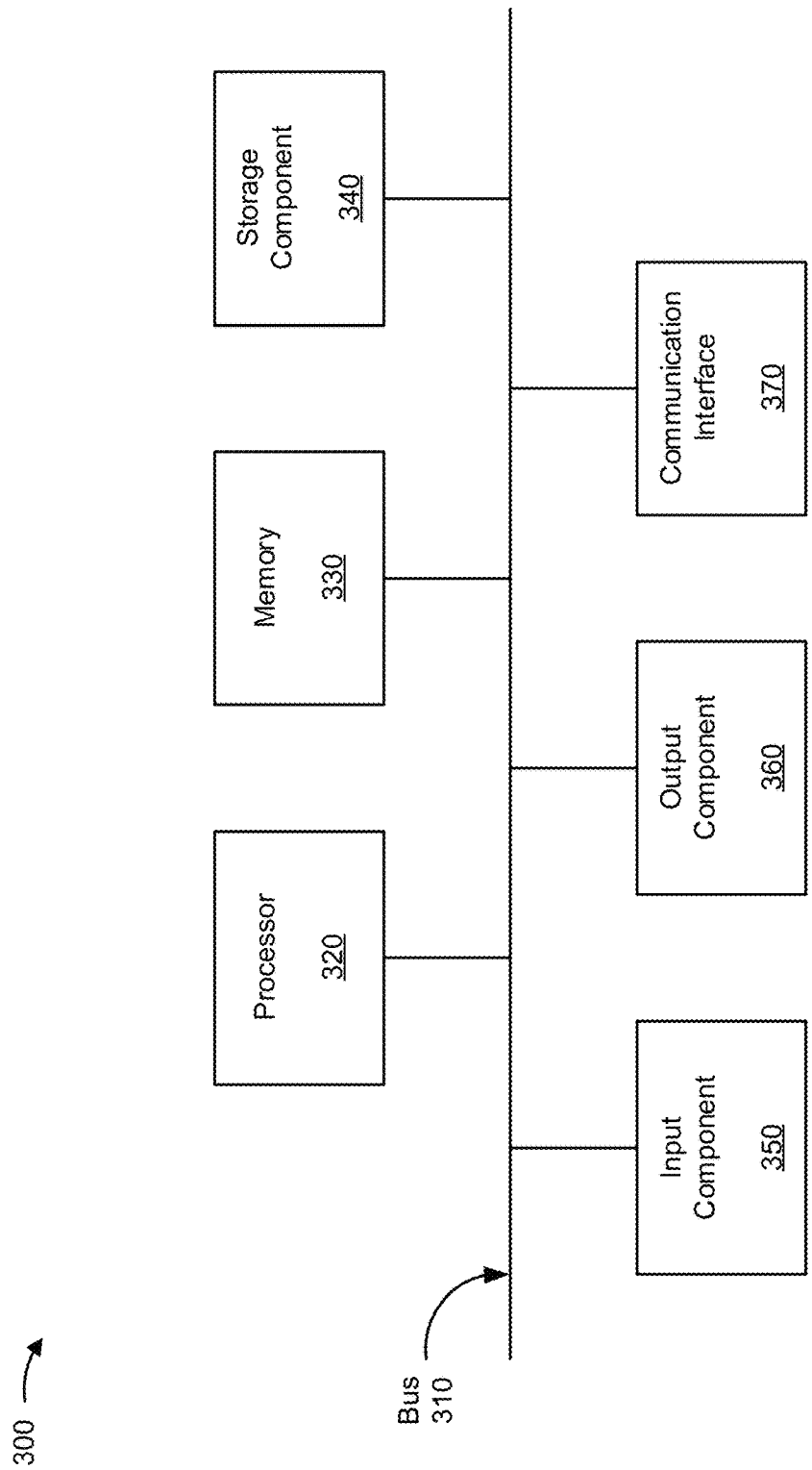
FIG. 3 is a diagram of example components of one or more devices of FIG. 2.

FIG. 3 is a diagram of example components of a device 300. Device 300 may correspond to NFV platform 210, host system 215, cloud environment 220, and/or network device 240. In some implementations, NFV platform 210, host system 215, cloud environment 220, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for synchronization between host system 215 and VNFs 230. In some implementations, one or more process blocks of FIG. 4 may be performed by NFV platform 210. In some implementations, one or more process blocks of FIG. 4 may be performed by another device or a group of devices separate from or including NFV platform 210, such as host system 215, VNF(s) 230, and/or network device 240.

As shown in FIG. 4, process 400 may include identifying a condition associated with one or more VNFs (block 410). For example, NFV platform 210 may identify a condition associated with one or more VNFs 230.

In some implementations, one or more VNFs 230 may be hosted by a host system 215 associated with NFV platform 210. Additionally, or alternatively, one or more VNFs 230 may be remote from host system 215 and/or NFV platform 210 (e.g., in cloud environment 220). In some implementations, NFV platform 210 may identify first information associated with VNFs 230. In this case, the first information may include information that identifies the condition, and/or may include other information regarding VNFs 230 (e.g., a status of VNFs 230 and/or the like).

In some implementations, the condition may relate to a physical interface or physical aspect of host system 215. For example, the condition may relate to a status of a physical link, a network interface controller (NIC) configuration, an IP address configuration, and/or the like. In some implementations, the condition may be detected by NFV platform 210 (e.g., based on monitoring physical links, based on negative acknowledgements (NACKs) from a downstream device, based on information obtained from host system 215, etc.).

In some implementations, NFV platform 210 may receive information identifying the condition. For example, an operating system of host system 215 may communicate with NFV platform 210 to identify the condition. As another example, VNFs 230 may provide information identifying the condition. In this case, VNFs 230 may provide the information via a serial interface (e.g., a virtio-serial interface) or an IP interface.

In some implementations, a condition may not be detectable by a VNF 230, so NFV platform 210 may use a communication channel and protocol described herein to generate and provide a message to VNF 230 identifying the condition and/or causing an action to be performed with respect to the VNF 230 or the condition, as described in more detail below.

As an example of a scenario in which NFV platform 210 may identify a condition associated with the one or more VNFs 230, assume that a router VNF 230 is implemented on NFV platform 210 with a set of virtual interfaces. In this case, assume that the virtual interfaces are operational and the routing protocols running in the router VNF 230 advertise links with which the virtual interfaces are associated, irrespective of the link status of the physical ports associated with the virtual interfaces. This can lead to black holing of traffic in the event of link failure of one or more of the physical ports of host system 215 as the router VNF 230 may continue to route traffic to the failed link, resulting in packet loss. In some implementations, the NFV platform 210 may detect the failed link condition through communication with the host system 215 (e.g., via a message exchange of one or more of the example messages described below).

As another example of a scenario in which NFV platform 210 may identify a condition associated with the one or more VNFs 230, assume that VNF 230 (e.g., a software-defined wide area network (SD-WAN) VNF) is associated with a primary interface (e.g., a 10G Ethernet interface) and a secondary interface (e.g., a long term evolution (LTE) interface), and the VNF 230 is configured to route packets out over the primary interface when the primary interface is operational, and to switch to the secondary interface when the primary interface is not operational. In this case, the VNF 230 may have no direct way of determining whether the primary interface is operational. In some implementations, the NFV platform 210 may detect that the condition of the primary interface not being operational based on communication with the host system 215 (e.g., via a message exchange of one or more of the messages described below).

As another example of a scenario in which NFV platform 210 may identify a condition associated with the one or more VNFs 230, assume that VNFs 230 utilize a traceroute function, and it is beneficial to enhance the traceroute function to provide information on where the VNFs 230 are implemented. In this case, the VNFs 230 may have no information associated with a platform (e.g., the NFV platform 210 or host system 215) that is hosting the VNFs 230. In some implementations, the NFV platform 210 may detect a traceroute condition and facilitate providing such information on the VNFs 230 to one another based on communication with the host system 215 and the VNFs 230 (e.g., via one or more message exchanges of one or more of the messages described below).

As another example of a scenario in which NFV platform 210 may identify a condition associated with the one or more VNFs 230, assume that NFV platform 210 provides password-free, yet secure, access to VNFs 230 that NFV platform 210 (or the host system 215) hosts, which may aid in Zero Touch Provisioning (ZTP) of the VNFs 230 and saving IP addresses (e.g., such that a remote controller can reach any VNF 230 via a single IP address). In this case, when VNFs 230 are activated, a user (e.g., a network administrator) may manually log into each VNF 230 and set up password-free access to that VNF 230, which may be cumbersome if a service provider is managing numerous (e.g., thousands) of NFV platforms, each running tens or hundreds of VNFs 230. Accordingly, in some implementations, NFV platform 210 may detect the password-free access condition of VNFs 230 using the communication framework between host system 215 and VNFs 230 described herein and enable the password-free access to VNFs 230 as described below.

As another example of a scenario in which NFV platform 210 may identify a condition associated with the one or more VNFs 230, assume that a VNF 230 is associated with a flow/session-based data plane and terminating/starting transmission control protocol (TCP) sessions. In a pure appliance-based environment, such a flow-based system may utilize the NIC's TCP checksum offload/TCP segmentation offload (TCO/TSO), to accelerate TCP performance. In a VNF-based environment, a VNF 230 may have only virtual interfaces and, for this reason, may not have information identifying whether the actual physical NIC (which is typically WAN facing) on the host system 215 is capable of TCO/TSO functions. In this case, the VNF 230 cannot take advantage of TCO/TSO capabilities on the NIC, which may result in inferior TCP/UDP performance. In some implementations, NFV platform 210 may detect the condition in which VNFs 230 may take advantage of TCO/TSO functions of a NIC of the host system 215 (e.g., when VNFs 230 have a flow/session-based data plane), and facilitate communication between the host system 215 and VNFs 230 to enhance TCP/UDP performance via the TCO/TSO functions of the NIC.

As further shown in FIG. 4, process 400 may include determining information to be provided or an action to be performed with regard to the one or more VNFs based on the condition (block 420). For example, NFV platform 210 may determine information to be provided with regard to the one or more VNFs 230 based on the condition. Additionally, or alternatively, NFV platform 210 may identify an action to be performed with regard to the one or more VNFs 230 based on the condition.

In some implementations, the information may identify the condition, may identify parameters or information associated with the condition, and/or the like. For example, for a link failure or link creation condition, the information may identify a name of a physical interface, an address of the physical interface, and/or an operational state of the physical interface. As another example, for an IP provisioning condition, the information may identify an IP address, subnet mask, gateway IP address, domain name server (DNS) address, and/or the like. As yet another example, for a NIC interface condition, the information may identify a name of a NIC, a maximum transmission unit (MTU) of a NIC, whether TCO and/or TSO is enabled, and/or the like. As still another example, for host information of the host system 215, the information may identify a host name, host IP address, and/or the like. As another example, for zero-touch provisioning (ZTP), the information may identify a file location of a ZTP file on the host system 215.

In some implementations, the action may be performed by VNF 230 based on the information. For example, for a link failure, the action may include sending an updated route advertisement. As another example, for IP provisioning, the action may include configuring communication using the IP information. As yet another example, for a NIC, the action may include configuring communication with the NIC. As still another example, for ZTP, the action may include configuring VNFs 230 based on the ZTP file.

As further shown in FIG. 4, process 400 may include generating or transmitting a message including the information and/or to cause the action to be performed with regard to VNFs 230 (block 430). For example, NFV platform 210 may generate and transmit a message to VNFs 230 and/or cause host system 215 to generate or transmit a message to VNFs 230. Additionally, or alternatively, NFV platform 210 may cause an action to be performed by VNFs 230 and/or cause an action to be performed with respect to VNFs 230.

In some implementations, NFV platform 210 may transmit the message via a serial interface, such as a virtio-serial interface or a similar interface between NFV platform 210 (or host system 215) and the one or more VNFs 230. In this way, NFV platform 210 may transmit the message via an interface that is uncomplicated relative to transmitting the message other than via a serial interface, that is always available, and/or that can work without IP connectivity between VNF 230 and NFV platform 210 (or host system 215).

In some implementations, NFV platform 210 may transmit the message via another type of interface, such as an IP interface. For example, when VNF 230 is remote from NFV platform 210, no serial interface may exist between VNF 230 and NFV platform 210. In such a case, NFV platform 210 may use an IP interface.

In some implementations, messages exchanged between the NFV platform 210, the host system 215, and/or VNFs 230 may have a particular format (e.g., based on a particular protocol). In some implementations, the format may be extensible, which may provide adaptability of the messaging format described herein. An example of the message format with Type-Length-Value (TLV) fields is shown below:

| 0 | 1 | 2 | 3 | 4 | 5 | 6 | 7 |
|---|---|---|---|---|---|---|---|
| VERSION ||||||||
| MESSAGE TYPE ||||||||
| PACKET LENGTH ||||||||
| TLV 1 ||||||||
| TLV 2 ||||||||
| . . . ||||||||
| TLV n ||||||||

In the above example:

VERSION may be for downward compatibility in the future. In some implementations, this field may be set to 1.

MESSAGE TYPE may hold one or more of the message types mentioned in the sections below. In some implementations, this field may be eight bits wide.

PACKET LENGTH may hold a value that identifies the length of the packet, including the header, in bytes. In some implementations, the maximum length of the packet may be 255 bytes.

A TLV represents a unit of information exchanged with this protocol. A particular message type can include any number of TLVs in the message, and each TLV will identify one particular sub-type, its length including the TLV header, and the actual value as ASCII coded text.

The below table provides possible information values for an example protocol packet format:

| MESSAGE TYPE | Description | Direction | TLVs used |
|---|---|---|---|
| INTERFACE STATUS | VNF gets this message whenever physical interface goes down | Host to VNF | TLV TYPE INTERFACE NAME<br>Name of the Interface<br>TLV TYPE INTERFACE OPER STATE<br>Operational state: UP/DOWN |
| MGMT ACCESS INFO | Management IP Provisioning | Host to VNF | TLV TYPE INET ADDRESS<br>IPv4 address (or IPv6 or later) for the management interface<br>TLV TYPE SUBNET MASK -<br>Subnet mask for the management Interface<br>TLV TYPE DEFAULT GATEWAY<br>Default gateway IPv4 address (or IPv6 or later)<br>TLV TYPE NAME SERVER ADDRESS<br>DNS server IPv4 address (or IPv6 or later) |

-continued

| MESSAGE TYPE | Description | Direction | TLVs used |
|---|---|---|---|
| INTERFACE CAPABILITY | WAN NIC capabilities - MTU, TCO/TSO capability, etc. | Host to VNF | TLV TYPE WAN PORT NAME<br>Value set to Name of the WAN facing NIC<br>TLV TYPE WAN PORT MTU<br>Value set to MTU of the WAN facing NIC<br>TLV TYPE WAN PORT TCO<br>Value set to TRUE/FALSE<br>TLV TYPE WAN PORT TSO<br>Value set to TRUE/FALSE |
| HOST INFO | Information pertaining to platform hosting the VNFs | Host to VNF | TLV TYPE HOST DEVICE NAME<br>Hostname configured on the host OS<br>TLV TYPE HOST MANAGEMENT IP ADDRESS<br>Management IPv4 address (or IPv6 or later) of the host OS |
| SERVICE WITHDRAWAL | VNF withdrawal from service chain | VNF to Host | TLV TYPE WITHDRAWAL REASON<br>Reason for withdrawal<br>TLV TYPE WITHDRAWAL DURATION<br>Optional TLV, mentions timer for adding VNF back, in minutes |
| ZTP INFO | Zero Touch Provisioning Information. VNF can connect to host via hypertext transfer protocol (HTTP) and download this file through wget/curl tools | Host to VNF | TLV TYPE STARTUP CFG FILE URL<br>File location on the host |
| HELLO REQ, HELLO REPLY | For non-IP based liveness detection, this message can be used, to detect if the VNF is up or down. | Both | TLV TYPE SEQ NUMBER<br>Sequence number of the hello request<br>TLV TYPE TIMESTAMP<br>Time on the sending device at the time of generating this packet |
| SSH PUBLIC KEY | Secure Shell (SSH) public key for password-less access to VNF | Host to VNF | TLV TYPE USER NAME<br>Username for SSH key pair<br>TLV TYPE SSH PUB KEY<br>Public key for the access |

In some implementations, NFV platform 210 may use the communication channel and protocol described herein to address the example scenarios described in connection with block 410 of FIG. 4, above.

With regard to the physical interface outage scenario described above, whenever physical links become non-operational or operational (e.g., go "down" or "up"), NFV platform 210 may notify VNF 230 by generating and/or transmitting an INTERFACE STATUS message, as described above. In this case, VNF 230 may map the message to one or many of its virtual interfaces. On receiving this message, VNF 230 may modify the virtual interface status accordingly, and may update routing protocols to advertise accurate reachability information that reflects an actual physical connectivity.

With regard to the primary interface outage scenario described above, platform software of NFV platform 210 may detect a loss of a primary link and switch over to a secondary link. In this case, NFV platform 210 may generate and/or transmit an INTERFACE STATUS message, as described above, that identifies the primary interface and a status of the primary interface ("down" in this case). By sending the INTERFACE STATUS message, VNF 230 may trigger a switchover to the secondary interface.

With regard to the traceroute scenario described above, a traceroute function may be modified to an enhanced version of the traceroute function where not only IP addresses of the hops are listed, but also more details about each hop (e.g., a type of device, hostname of the device, and location) are listed. In some implementations, NFV platform 210 may generate and/or transmit a HOST INFO message, as described above, and may share a host name of host system 215 with VNF 230 in the HOST INFO message. In this case, VNF 230 may add the information in trace probes so as to identify VNF 230 as a VNF, and to identify where VNF 230 is hosted. For example, the VNF 230 host name, location, etc. may be useful in troubleshooting or providing visibility into virtualized networks.

With regard to the ZTP scenario described above, by using the communication framework described herein between NFV platform 210, host system 215, and VNFs 230, a need to manually log into each VNF 230 may be avoided, and the access process may be automated. For example, once a public key is set up, the public key may be exported by NFV platform 210 generating and/or transmitting an SSH PUBLIC KEY message, as described above, to VNFs 230. In this case, if required, NFV platform 210 may generate and/or transmit a ZTP INFO message, as described above, to VNF 230 to bootstrap the VNF 230 with a custom configuration.

With regard to the NIC interface scenario described above, NFV platform 210 may advertise the capabilities of WAN facing NIC to VNFs 230 by generating and/or transmitting an INTERFACE CAPABILITY message, as described above. In this case, VNF 230 may adjust its TCP protocol stack to turn on TCO/TSO functionality, giving better TCP/UDP performance.

In this way, some implementations described herein may provide efficient techniques for remedying frequently-encountered problems or limitations in scenarios associated with Virtual Network Functions.

In some implementations, a message may include a direction element. For example, the direction element may indicate whether host system 215 is transmitting the message to VNF 230, or whether VNF 230 is transmitting the message to the host system 215. In this way, a message transmitted in the wrong direction (e.g., a direction inconsistent with an actual direction of the message) may be silently discarded, which may protect the host system 215 from misuse of the protocol to obtain sensitive information.

As a particular example, SSH PUBLIC KEY messages are intended to be sent from host system 215 to VNFs 230, rather than from VNFs 230 to host system 215. If host system 215 receives an SSH PUBLIC KEY message from a VNF 230, the SSH PUBLIC KEY message may be treated as an attack based on the direction element, the packet may be silently discarded, and/or the event may be reported to an administrator. Additionally, or alternatively, the variety of information exported to VNF 230 by host system 215 may be limited to network events and basic operational needs, and may not include sensitive information regarding host system 215. Additionally, or alternatively, NFV platform 210 may install IP table rules to discard unwanted or unexpected packets from VNFs 230. In this way, security of NFV platform 210 and/or host system 215 may be improved.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein may provide a communication channel and protocol for communication between an NFV platform and VNFs to exchange information regarding the host system and/or other VNFs. For example, some implementations described herein may provide a standardized messaging system to convey information regarding physical aspects of the host system to VNFs hosted on the host system. In this way, states of physical interfaces, parameters associated with the host system, IP information, and/or the like can be communicated from the NFV platform to the VNFs, which improves performance of the VNFs and reduces the occurrence of problems relating to lack of visibility of physical aspects of the host system. Thus, VNF performance may be improved without requiring implementation of an external controller or resource-intensive monitoring operations by the VNFs. As a result of improved VNF performance, devices utilizing the VNFs or receiving a service via the VNFs may receive improved performance and avoid traffic black holing or packet loss.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A network function virtualization (NFV) platform, comprising:
   a memory; and
   one or more processors to:
      identify a condition associated with the NFV platform, where the condition affects operation of at least one virtual network function (VNF) hosted by or associated with the NFV platform;
      determine, based on the condition, information to be provided or an action to be performed with regard to the at least one VNF; and
      transmit a message identifying the information and/or to cause the action to be performed with regard to the at least one VNF,
         the message including a value indicating a type of message,
            the value indicating a first type of message sent from the NFV platform to a VNF or a second type of message sent from the VNF to the NFV platform, and
            the at least one VNF is to discard the message, transmitted by the NFV platform, if the value indicates the second type of message sent from the VNF to the NFV platform.

2. The NFV platform of claim 1, where the condition is associated with a physical interface associated with the NFV platform.

3. The NFV platform of claim 2, where the information indicates a status of the physical interface.

4. The NFV platform of claim 1, where the action includes updating a routing protocol of the at least one VNF.

5. The NFV platform of claim 1, where the information includes information identifying the NFV platform.

6. The NFV platform of claim 1, where the information includes information identifying a capability of a network interface controller.

7. The NFV platform of claim 1, where the message is transmitted via a serial interface between the NFV platform and the at least one VNF.

8. A method, comprising:
   identifying, by a network function virtualization (NFV) platform, first information associated with the NFV platform,
      where the first information relates to operation of at least one virtual network function (VNF) hosted by or associated with the NFV platform;
   determining, by the NFV platform and based on the first information, second information to be provided or an action to be performed with regard to the at least one VNF; and
   providing, by the NFV platform, a message identifying the second information and/or to cause the action to be performed with regard to the at least one VNF,
      where the message includes a value indicating a type of message,
         the value selectively indicating a first type of message sent from the NFV platform to a VNF or a second type of message sent from the VNF to the NFV platform,
         the at least one VNF is to discard the message, transmitted by the NFV platform, if the value indicates the second type of message sent from the VNF to the NFV platform.

9. The method of claim 8, where the first information identifies a condition of a physical interface associated with the NFV platform.

10. The method of claim 8, where the message comprises a message type field, a packet length field, or at least one type-length-value (TLV) field that includes the second information.

11. The method of claim 8, where the message is provided to at least one VNF that is not hosted by the NFV platform.

12. The method of claim 8, where the first information is received from the at least one VNF.

13. The method of claim 8, where the second information includes Internet Protocol provisioning information.

14. The method of claim 8, where the second information is included in a field of the message that has a type-length-value format.

15. A non-transitory computer-readable medium storing instructions, the instructions comprising:
   one or more instructions that, when executed by one or more processors, cause the one or more processors to:
      identify a condition associated with a physical interface associated with a network function virtualization (NFV) platform,
         where the condition affects operation of at least one virtual network function (VNF) hosted by or associated with the NFV platform;
      determine, based on the condition, information to be provided and an action to be performed with regard to the at least one VNF; and
      transmit a message identifying the information and to cause the action to be performed with regard to the at least one VNF,
         the message including a value indicating a type of message,
            the value selectively indicating a first type of message sent from the NFV platform to a VNF or a second type of message sent from the VNF to the NFV platform,
            the at least one VNF is to discard the message, transmitted by the NFV platform, if the value indicates the second type of message sent from the VNF to the NFV platform.

16. The non-transitory computer-readable medium of claim 15, where the at least one VNF is to notify an administrator if the value indicating the type of message indicates the second type of message.

17. The non-transitory computer-readable medium of claim 15, where the condition is identified by a host operating system of the NFV platform.

18. The non-transitory computer-readable medium of claim 15, where the information indicates a status of the physical interface.

19. The non-transitory computer-readable medium of claim 15, where the action includes configuring communication from the NFV platform to the at least one VNF using internet protocol (IP) information.

20. The non-transitory computer-readable medium of claim 15, where the action includes configuring communication from the NFV platform to the at least one VNF using network interface controller (NIC) configuration.

* * * * *